April 19, 1938.  O. J. HORGER ET AL  2,114,978
APPARATUS FOR COLD ROLLING AXLE JOURNALS
Filed Jan. 4, 1937  2 Sheets-Sheet 1
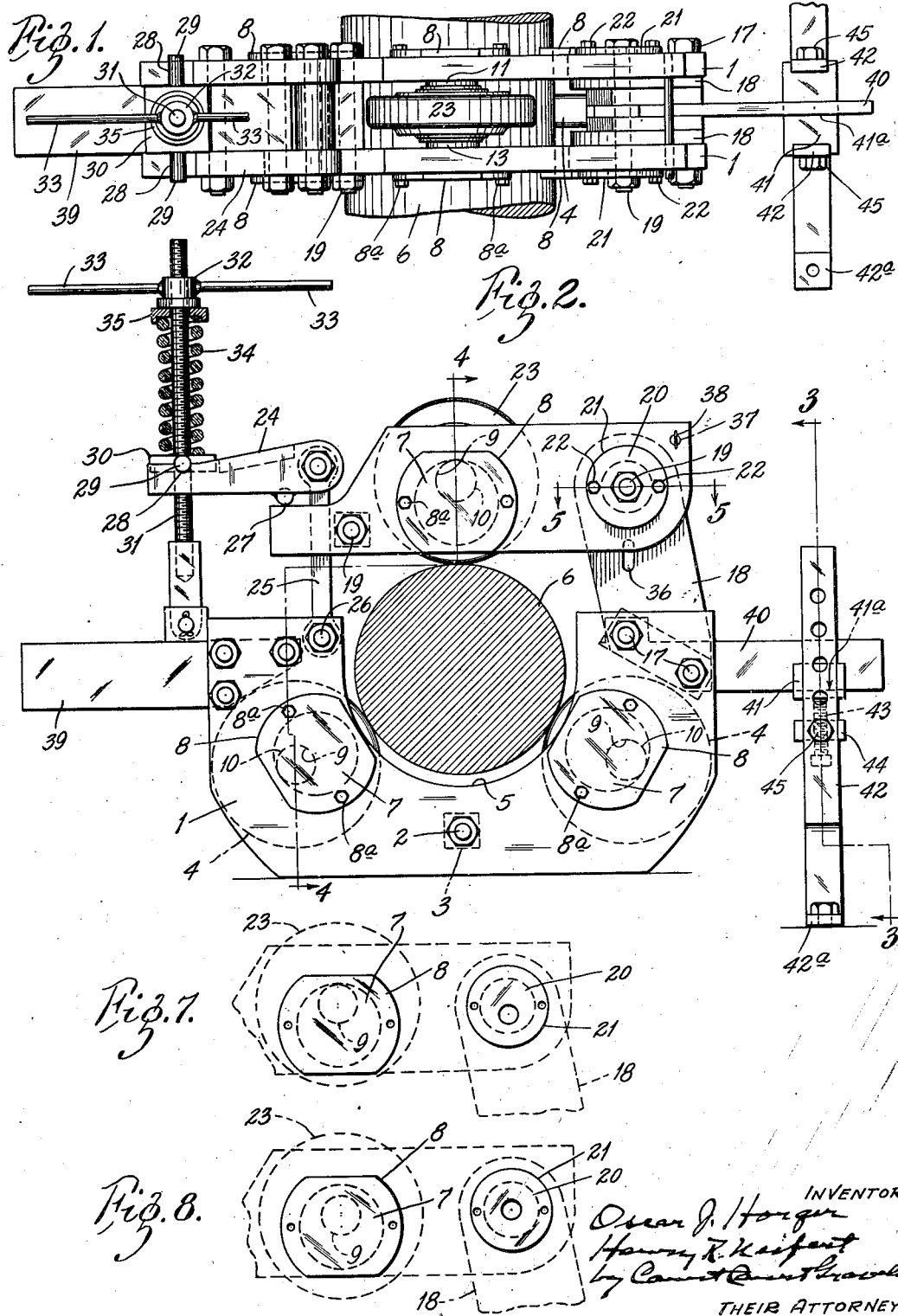
INVENTORS
Oscar J. Horger
Harvey R. Keifert
THEIR ATTORNEYS.

April 19, 1938.   O. J. HORGER ET AL   2,114,978
APPARATUS FOR COLD ROLLING AXLE JOURNALS
Filed Jan. 4, 1937   2 Sheets-Sheet 2
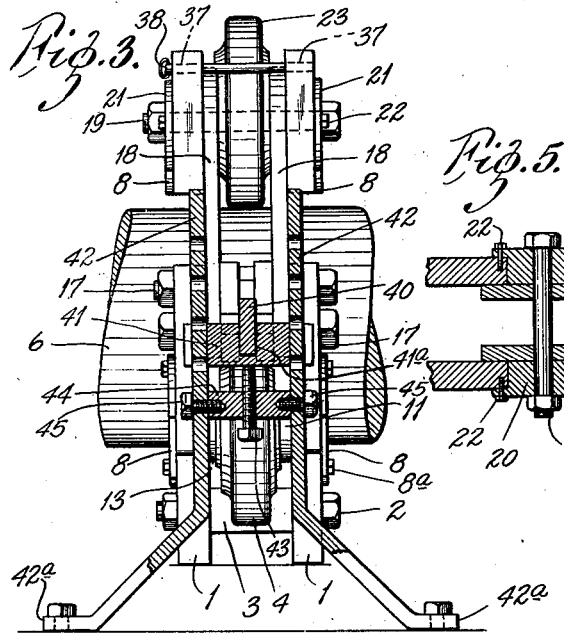

Patented Apr. 19, 1938

2,114,978

UNITED STATES PATENT OFFICE 2,114,978

APPARATUS FOR COLD ROLLING AXLE JOURNALS

Oscar J. Horger and Harry R. Neifert, Canton, Ohio, assignors to The Timken Roller Bearing Company, Canton, Ohio, a corporation of Ohio Application January 4, 1937, Serial No. 118,961

13 Claims. (Cl. 80—22)

Our invention relates to an apparatus for burnishing or cold rolling the journal portions of axles and shafts. The principal object of the invention is to adapt such apparatus for work on journals of different diameters. Another object is to prevent canting or skewing of such apparatus with respect to the axis of the work piece. The invention consists in the parts and in the combinations and arrangements of parts hereinafter described and claimed.

In the accompanying drawings wherein like reference numerals indicate like parts wherever they occur, Fig. 1 is a plan view of an an apparatus embodying our invention together with a portion of the journal of an axle or shaft;

Fig. 2 is a side elevation of said device with the axle or work piece shown in cross section;

Fig. 3 is partly an end elevation and partly a vertical cross section on the line 3—3 of Fig. 2;

Fig. 4 is a vertical cross section on the line 4—4 of Fig. 2;

Fig. 5 is a fragmentary horizontal section on the line 5—5 of Fig. 2;

Fig. 6 is a side elevation of the device in open position and adapted for application to a journal of smaller diameter than that shown in Fig. 2;

Figs. 7 and 8 are detail views illustrating the substitution of different bushings for those shown in Fig. 2;

Fig. 9 is a perspective view of the guide supporting block; and

Fig. 10 is a perspective view of the block which supports the screw for adjustably supporting the block shown in Fig. 9.

The frame of our apparatus comprises a base member consisting of two heavy side plates 1 firmly secured together by bolts 2 but spaced apart by suitable spacing members 3 far enough to accommodate a work roller 4 between them. The top sides of these plates have a recess 5 therein large enough to receive the journal 6 of the axle or other work piece. Horizontal cylindrical holes are made in the side plates, the holes in one side plate being in axial alinement with the respective holes in the opposite side plate. These holes form seats for bushings 7 whose body portions have cylindrical outer surfaces which fit in said seats, respectively, and are provided at their ends with circumferential flanges 8 that lap over the face of the side plate. These flanges are provided with holes that are diametrically opposite and extend through said flanges and register with threaded holes provided therefor in the side plates. The bushings 7 are held in position by cap screws 8a that extend through the holes of the flange into the holes in the side plates. This arrangement permits the bushings to be set in either of two positions 180 degrees apart.

The inner bore of the bushing illustrated in Fig. 4 is a cylindrical recess 9 that is eccentric with relation to the outer surface of the bushing, and the arrangement is such that in both set positions of the bushing, its own axis and the axis of its bore lie in or adjacent to a straight line that is radial or substantially radial with relation to the journal or work piece and extends through the point of contact of the work roll with the journal.

Mounted in the recesses 9 of opposite bushings is a pin 10 which has an annular rib 11 that bears against the inner face of one of said bushings and serves as an abutment for the large end of a cone or conical inner bearing member 12. The other end portion of the pin is provided with a screw thread on which is a threaded nut or ring 13 which serves as an abutment for the large end of a second cone or conical inner bearing member 14 mounted on said pin and also as an abutment for the inner end of the opposite bushing. Series of taper rollers 15 are mounted on said inner bearing members and cooperate with conical cups or outer bearing members 16 that are mounted in the eye or hub of the work roller 4. The work roller has a periphery that is substantially cylindrical with its end portions somewhat tapered or rounded off.

Firmly secured to the upper portion of one end of the side plates, as by bolts 17, are a pair of upwardly extending plates 18 through which a horizontal bolt 19 extends in rigid relation thereto. On the opposite ends of this bolt are bushings 20 with cylindrical outer surfaces which fit in cylindrical holes provided therefor in two heavy plates which are spaced apart but firmly secured together, as by bolts 19, so as together to constitute a single throat-latch member. These bushings 20 have peripheral flanges 21 which are provided with diametrically opposite holes to receive cap screws 22 which work in threaded holes provided therefor in the respective lever arms. By this arrangement, the bushings 20 may be set in either of two positions 180 degrees apart. In the bushing illustrated in Fig. 5 and Fig. 8, the bore is axial; but in the bushing illustrated in Fig. 7, the bore is eccentric and so disposed that it will shift vertically from one set position to the other.

The throat latch member extends above the work opening or recess in the base member 1 and is provided with a work roller 23 mounted similarly to those hereinbefore described. In their working positions, the three work rollers 4, 23 are disposed substantially parallel and equidistant from the axis of the journal or work piece and equidistant from each other. Thus, each work roll is in staggered relation to the other two work rolls.

Pressure is applied to the free ends of the throat latch member in a downward direction by means of a lever 24 whose short arm is pivotally connected to one end of a link 25 whose other end is pivotally mounted on a horizontal bolt 26 which extends through the upper portion of the adjacent end of the side plates 1 of the base member of the frame. The link 25 extends upwardly through the bifurcated free end of said throat latch member and is connected to the lever 24 above said arm. The underside of said lever 24 has a rounded pin or bearing member 27 welded thereto in position to bear against the free end of said throat latch member. The free end of said lever 24 is bifurcated and its upper edge is provided with a notch or notches 28 in which rest cylindrical lugs 29 on the sides of a perforated plate 30. A threaded rod 31 extends through said plate and is pivotally secured at its lower end to said side plates 1 of said base member and its upper end is provided with a nut 32 which has arms or wings 33 by which it may be manipulated. The rod 31 is surrounded by a helical spring 34 whose lower end bears against said plate 30 and whose upper end bears against a washer 35 which in turn abuts against said nut 32. By this arrangement, the pressure of the spring 34 is transmitted through the lever 24 to the throat latch member and thence to and through the top roller to the journal or work piece. The pressure of the spring is increased or decreased at will by turning the nut 32.

When it is desired to open the apparatus, the nut 32 is backed up to relieve the pressure of the spring whereupon the rod 31 is swung outwardly on its pivot into a substantially horizontal position, the lugs 29 easily riding out of their receiving grooves when the spring pressure is sufficiently slack. This movement swings the vertical link 25 and the horizontal lever 24 outwardly clear of the end of the throat latch member, whereupon said arm can be swung on its own pivot into the position shown in Fig. 6. In this position, it is easy to enter and remove the work piece.

In order to keep the throat latch member from swinging too far, the supports therefor are provided with slots 36 and said member is provided with holes 37 in position to register with said slots when said lever arm is swung into open position. A locking pin 38 provided with a suitable means for gripping the end thereof extends through said holes and slots and serves to hold the lever arms in open position.

In order to adapt my apparatus for use in a lathe, it is provided with diametrically opposite mounting bars 39 and 40, respectively, bolted to and between the side plates 1 of the base member just above the rollers 4. The bar 39 is of suitable size to fit slidably in the tool post of the lathe; and the bar 40 is slidably supported in a groove 41a provided therefor in the top of a block 41 that is slidable between two guide posts 42, which are provided with perforated flanges 42a to receive cap screws by which they are secured to the carriage of the lathe. The slide block is supported on the upper end of a screw 43 which is threaded through a block 44 slidable between the guide posts 41. Each of these guide posts has a series of perforations therein and through these perforations extend cap screws 45 adapted to engage threaded holes provided therefor in the post opposing ends of said block. By this arrangement, the apparatus is slidably supported on opposite sides of the work piece and thus as a whole is free to float transversely thereof and thereby is enabled to equalize the pressure of the three work rollers thereon. The groove 41a in the supporting block prevents the device from canting or skewing endwise of the work; and said block may be positioned at the proper level by manipulating the adjustable screw support 43 therefor.

It is noted that in the condition illustrated in Fig. 2, the axes of the recesses of the bushings of the work rollers are further from the center of the work piece than are the axes of the exterior surfaces of the bushings. As the axes of the work rollers coincide with the axes of the recesses in the bushings, this arrangement of the bushings spaces the rollers further apart than they are when the recesses in the bushings are closer to the axis of the apparatus, as they are shown in Fig. 6. In other words, the arrangement of the bushings shown in Fig. 2 accommodates a larger work piece than the arrangement shown in Fig. 6.

The bushings herebefore described may be made to be set in other than the two diametrically opposite positions above described; but when the journal of the work piece is of a size for which said bushings are not adapted, we prefer to replace them with similar bushings wherein the eccentricity of the recesses is greater or less, as may be required, as illustrated, for instance, in Fig. 8.

In the construction illustrated in Figs. 2 and 5, the bushings on which the throat latch member is mounted have axial holes for the pivot bolt. In the construction illustrated in Fig. 7, however, the bore through which the pivot bolt passes is eccentric with relation to the outer surface of the bushing. By rotating such bushing through an angle of 180 degrees, the bore thereof is raised or lowered, as may be required to keep the work rolls equidistant within a close approximation when their bushings are shifted to accommodate work of different sizes.

While we have described the bushings as having a cylindrical outer surface fitting in the cylindrical openings in the frame, it is obvious that said bushings and openings may be elliptical or polygonal or other noncircular shape; but the cylindrical form has the advantage of being much easier and more economical to produce. Likewise, it is obvious that cylindrical bushings are capable of other adjustments than the 180 degree adjustment described; but such 180 degree adjustment has the advantage that in either of its two set positions, the pressure acts on dead center, as above explained.

What we claim is:

1. In an apparatus of the kind described, a framework comprising one member having seats for two bushings and a second member pivoted to the first and having a seat for one bushing, bushings with eccentrically positioned bores in the seats of said first mentioned member, pins in said bores, roller bearings on said pins and work rollers on said bearings, the axes of said rollers being substantially parallel and equidistant apart, the axes of the respective bushings and their bores lying in lines which intersect substantially equidistantly from the axes of said bores.

2. In an apparatus of the kind described, a framework comprising one member having seats for two bushings and a second member pivoted to the first and having a seat for one bushing, bushings with eccentrically positioned bores removably mounted in said seats and replaceable with like bushings of different eccentricity, pins in said bores, roller bearings on said pins and work rollers on said bearings, the axes of said rollers being substantially parallel and equidistant apart, the axes of the respective bushings and their bores lying in lines which intersect substantially equidistantly from the axes of said bores.

3. In an apparatus of the kind described, a framework comprising one member having seats for two bushings and a second member pivoted to the first and having a seat for one bushing, bushings with eccentrically positioned bores in said seats, pins in said bores, roller bearings on said pins and work rollers on said bearings, the axes of said rollers being substantially parallel and equidistant apart, the axes of the respective bushings and their bores lying in lines which intersect substantially equidistantly from the axes of said bores.

4. In an apparatus of the kind described, a framework comprising one member having seats for two bushings and a second member pivoted to the first and having a seat for one bushing, cylindrical bushings with eccentrically positioned bores in said seats, pins in said bores, roller bearings on said pins and work rollers on said bearings, the axes of said rollers being substantially parallel and equidistant apart, the axes of the respective bushings and their bores lying in lines which intersect substantially equidistantly from the axes of said bores, and means for holding said bushings in either of two diametrically opposite positions.

5. In an apparatus of the kind described, a framework comprising one member having two work rollers and a second member pivoted to the first and having one work roller, the axes of said rollers being substantially parallel and equidistant apart in working position, and means for mounting said work rollers, said means comprising cylindrical bushings rotatably mounted in said members and having eccentric bores, pins in said bores and roller bearings on said pins, the work rollers being mounted on said bearings.

6. In an apparatus of the kind described, a framework comprising one member having two work rollers and a second member pivoted to the first and having one work roller, the axes of said rollers being substantially parallel and equidistant apart in working position, and means for mounting said work rollers, said means comprising cylindrical bushings rotatably mounted in said members and having eccentric bores, means for securing said bushings to said members in different positions of rotational adjustment, pins in said bores and roller bearings on said pins, the work rollers being mounted on said bearings.

7. In an apparatus of the kind described, a framework comprising one member having two work rollers and a second member pivoted to the first and having one work roller, the axes of said rollers being substantially parallel and equidistant apart in working position, the means for pivoting said members together comprising alined bushings seated in one of them and provided with non-axial bores and a pin mounted in said bores and extending freely through the other member whereby rotation of the bushings varies the position of the pivot axis.

8. In an apparatus of the kind described, a framework comprising one member having two work rollers and a second member pivoted to the first and having one work roller, the axes of said rollers being substantially parallel and equidistant apart in working position, and means for mounting said work rollers, said means comprising cylindrical bushings with eccentric bores, pins in said bores and roller bearings on said pins, the work rollers being mounted on said bearings, the means for pivoting said members together comprising alined bushings seated in one of them and provided with non-axial bores and a pin mounted in said bores and extending freely through the other member, whereby rotation of the bushings varies the position of the pivot axis.

9. An attachment for lathes comprising a framework having a mounting bar adapted for engagement with the tool post of a lathe, said framework comprising frame members spaced apart and provided with seats for three parallel bushings arranged in staggered relation, bushings rotatably mounted in said seats and having eccentric bores, pins mounted in the bores of said bushings, taper roller bearings mounted on said pins and rollers mounted on said bearings.

10. An attachment for lathes comprising a framework having a mounting bar adapted for engagement with the tool post of a lathe, said framework comprising frame members spaced apart and provided with seats for three parallel bushings arranged in staggered relation, bushings rotatably mounted in said seats and having eccentric bores, pins mounted in the bores of said bushings, taper roller bearings mounted on said pins and rollers mounted on said bearings, the bores of said bushings being non-axial to enable the pins to be adjusted.

11. An attachment for lathes comprising a framework having a mounting bar adapted for engagement with the tool post of a lathe, said framework comprising frame members spaced apart and provided with seats for three parallel bushings arranged in staggered relation, bushings rotatably mounted in said seats and having eccentric bores, pins mounted in the bores of said bushings, taper roller bearings mounted on said pins and rollers mounted on said bearings, each bearing comprising two cones tapering toward each other, two cups and two series of taper rollers between said cones and cups, each pin having a fixed rib at one side of its bearing and an adjustable rib on the other side thereof.

12. In an apparatus of the kind described, a framework comprising one member having two work rollers and a second member pivoted to the first and having one work roller, and means for applying pressure to the free end of said pivoted member, said means comprising a link pivoted to said first member and extending beyond said free end, a lever pivoted to said link, a threaded rod pivoted to said first member, a threaded nut on said rod and a spring interposed between said nut and the free end of said lever, said lever having a rib adjacent to its pivot in position to bear against the free end of said second member.

13. In an apparatus of the kind described, a framework comprising one member having two work rollers and a second member pivoted to the first and having one work roller, and means for applying pressure to the free end of said pivoted member, said means comprising a link pivoted to said first member and extending beyond said free end, a lever pivoted to said link, a threaded rod pivoted to said first member, a threaded nut on said rod and a spring interposed between said nut and the free end of said lever, said lever having a rib adjacent to its pivot in position to bear against the free end of said second member.

OSCAR J. HORGER.
HARRY R. NEIFERT.